(12) United States Patent
Alves De Moraes et al.

(10) Patent No.: US 10,486,722 B2
(45) Date of Patent: Nov. 26, 2019

(54) CONNECTED WORKSTATION SERVICE CART

(71) Applicants: Bosch Automotive Service Solutions LLC, Warren, MI (US); Robert Bosch GmbH, Stuttgart (DE)

(72) Inventors: Marcelo Alves De Moraes, Apple Valley, MN (US); Kevin Kicinski, Whitmore Lake, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/021,702

(22) Filed: Jun. 28, 2018

(65) Prior Publication Data

US 2019/0002005 A1    Jan. 3, 2019

Related U.S. Application Data

(60) Provisional application No. 62/527,588, filed on Jun. 30, 2017.

(51) Int. Cl.
| | |
|---|---|
| *B60B 30/10* | (2006.01) |
| *B62B 3/00* | (2006.01) |
| *B62B 3/10* | (2006.01) |
| *B25H 3/00* | (2006.01) |
| *B25H 5/00* | (2006.01) |
| *B25H 3/02* | (2006.01) |
| *B60B 33/00* | (2006.01) |

(52) U.S. Cl.
CPC ............ *B62B 3/005* (2013.01); *B25H 3/006* (2013.01); *B25H 3/028* (2013.01); *B25H 5/00* (2013.01); *B60B 33/00* (2013.01); *B62B 3/104* (2013.01); *B25H 3/02* (2013.01); *B60B 30/10* (2013.01); *B62B 2203/00* (2013.01)

(58) Field of Classification Search
CPC ..... B62B 3/005; B62B 3/104; B62B 2203/00; B60B 33/00; B60B 30/10; B25H 3/028; B25H 5/00; B25H 3/006; B25H 3/02
See application file for complete search history.

(56) References Cited

U.S. PATENT DOCUMENTS

| | | | |
|---|---|---|---|
| 4,366,998 A * | 1/1983 | Kaiser | B25H 1/12 297/188.13 |
| 4,759,560 A | 7/1988 | Virgulti | |
| 4,989,291 A * | 2/1991 | Parent | A47L 9/0027 15/315 |

(Continued)

FOREIGN PATENT DOCUMENTS

| | | |
|---|---|---|
| CN | 205185954 | 4/2016 |
| DE | 20316418 | 3/2004 |

*Primary Examiner* — Jacob B Meyer
(74) *Attorney, Agent, or Firm* — David Kovacek; Maginot, Moore & Beck LLP

(57) ABSTRACT

A vehicle service cart having a rolling base and a cabinet structure extending, therefrom. The service cart further comprises a plurality of handles operable to serve as wheel-mounts without disrupting rolling functions of the cart. The service cart further comprises a compressed-air tank. The service cart further comprises a specialized work surface atop the cabinet structure, the specialized work surface having specialized recesses to hold particular tools.

20 Claims, 3 Drawing Sheets

(56) References Cited

U.S. PATENT DOCUMENTS

| | | | | |
|---|---|---|---|---|
| 5,183,372 A * | 2/1993 | Dinverno | | B25H 3/00 14/71.1 |
| 5,269,545 A * | 12/1993 | Huebschen | | A47B 31/00 220/345.1 |
| 5,323,098 A | 6/1994 | Hamaguchi et al. | | |
| 5,423,651 A * | 6/1995 | Dinverno | | B25H 3/00 280/47.35 |
| 5,509,672 A * | 4/1996 | Offerson | | B25H 1/04 280/47.35 |
| 5,518,310 A * | 5/1996 | Ellman | | A61G 12/001 312/209 |
| 5,538,809 A | 7/1996 | Bittihn et al. | | |
| 6,120,234 A | 9/2000 | Dinverno | | |
| 6,180,000 B1 * | 1/2001 | Wilbur | | A61B 18/00 210/143 |
| 6,702,608 B2 * | 3/2004 | Brennan, Jr. | | B25H 3/00 280/47.19 |
| 6,893,425 B2 * | 5/2005 | Dunn | | A61L 11/00 604/319 |
| D512,149 S * | 11/2005 | Bochner | | D24/185 |
| 7,258,711 B2 * | 8/2007 | Dunn | | A61L 11/00 134/22.18 |
| 7,879,228 B2 * | 2/2011 | Dunn | | A61L 11/00 137/205 |
| 8,322,732 B2 * | 12/2012 | McKay | | A47B 77/08 280/47.34 |
| 8,405,249 B2 | 3/2013 | Leadingham et al. | | |
| 8,608,260 B2 * | 12/2013 | Wishlade | | B25H 1/12 312/319.8 |
| 9,095,863 B1 * | 8/2015 | Galbraith | | B05B 7/205 |
| 9,123,449 B2 * | 9/2015 | Quirico | | A61M 5/14 |
| 9,254,856 B2 * | 2/2016 | Oachs | | B62B 3/005 |
| 9,289,896 B2 * | 3/2016 | Cole | | A47B 45/00 |
| 9,327,748 B2 * | 5/2016 | Wu | | B62B 3/002 |
| 9,630,312 B2 * | 4/2017 | Grela | | A47B 31/00 |
| 9,694,839 B2 * | 7/2017 | Canady | | B62B 3/104 |
| 2003/0164600 A1 * | 9/2003 | Dunn | | A61L 11/00 280/47.34 |
| 2005/0280228 A1 * | 12/2005 | Fernandes | | B25H 1/00 280/47.35 |
| 2006/0103090 A1 * | 5/2006 | Fernandes | | B25H 1/00 280/47.34 |
| 2006/0244228 A1 * | 11/2006 | Huguet | | A47B 95/043 280/47.35 |
| 2007/0182114 A1 * | 8/2007 | Fernandes | | B25H 3/00 280/47.35 |
| 2007/0207042 A1 * | 9/2007 | Hahn | | B08B 3/026 417/234 |
| 2007/0228680 A1 | 10/2007 | Reppert et al. | | |
| 2009/0243243 A1 * | 10/2009 | Watson | | B25H 3/02 280/47.35 |
| 2010/0108781 A1 * | 5/2010 | Terrizzi | | B08B 3/026 239/332 |
| 2012/0007483 A1 * | 1/2012 | Wishlade | | B25H 1/02 312/237 |
| 2014/0205513 A1 * | 7/2014 | Affaitati | | A61L 2/18 422/292 |
| 2014/0265440 A1 * | 9/2014 | Chen | | B62B 5/0006 296/186.1 |
| 2015/0023839 A1 * | 1/2015 | Snyder | | A61L 2/07 422/28 |
| 2015/0107625 A1 * | 4/2015 | Erwin | | F02B 77/04 134/18 |
| 2015/0107627 A1 * | 4/2015 | Snyder | | A61B 90/70 134/22.1 |
| 2015/0210306 A1 * | 7/2015 | Oachs | | B62B 3/005 280/79.11 |
| 2017/0001527 A1 | 1/2017 | Prokhorov | | |
| 2019/0002005 A1 * | 1/2019 | Alves De Moraes | | B25H 3/028 |

* cited by examiner

CONNECTED WORKSTATION SERVICE CART

TECHNICAL FIELD

This disclosure relates to service facilities and in particular service carts used by technicians working in service facility environments.

BACKGROUND

Servicing vehicles, such as for repair or maintenance, usually requires a wide array of tools, ranging from manual tools such as screwdrivers and socket wrenches, to pneumatic tools, such as air wrenches, and several types of diagnostic tools, such as electrical instruments. In many service facilities, also known as workshops, the tools and instruments required by the service technician(s) are housed in cabinets and work benches that line the perimeter of the service facility. Depending upon the type of service being performed, the technician(s) may require ready access to several tools and instruments, and may require ready access to those tools at a part of the vehicle that is distant from the cabinet or work bench.

Mobile tool boxes have been introduced to address this concern. However, existing mobile tool boxes are generally unable to provide particular support for specialized tools, such as charging capabilities for electric power tools, pressurized air tanks for air hoses, or specialized mounting structures to make the tools readily accessible by the technician during work.

SUMMARY

Disclosed herein is a vehicle service cart having a rolling base and a cabinet structure extending therefrom. The service cart further comprises a plurality of handles that can also serve as wheel-mounts to support wheels removed from a vehicle without disrupting the stability of the service cart while rolling or at a standstill. The service cart further comprises a compressed-air tank, preferably disposed within the cabinet structure. The service cart further comprises a specialized work surface atop the cabinet structure, the specialized work surface having specialized recesses to hold particular tools.

In an embodiment of the present invention, the service cart further comprises a rechargeable electric battery, preferably disposed within the cabinet structure.

In an embodiment of the present, invention, the service cart further comprises a charging dock operable to fill or discharge the compressed-air tank. The service cart can also provide electrical charge to the electrical battery using the charging dock.

In an embodiment of the present invention, the work surface further comprises a mounting structure to mount a portable electronic service tool.

In an embodiment of the present invention, the compressed-air tank further comprises a pneumatic transducer providing a pressure-level signal indicating the internal pressure of the compressed-air tank. The pneumatic transducer is further operably coupled to a wireless transmitter to transmit the pressure-level signal to another device in wireless communication with the transmitter.

In an embodiment of the present invention, one or more of a pneumatic transducer, battery-charge indicator, a portable electronic service tool, or a particular tool is operably connected to a wireless network.

In an embodiment of the present invention, the compressed-air tank is operable to fill the tires of a vehicle with air.

In an embodiment of the present invention, the work surface further defines an access portal into the cabinet structure. The access portal further being operable to permit passage of a hose or cable into or out of the cabinet structure.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
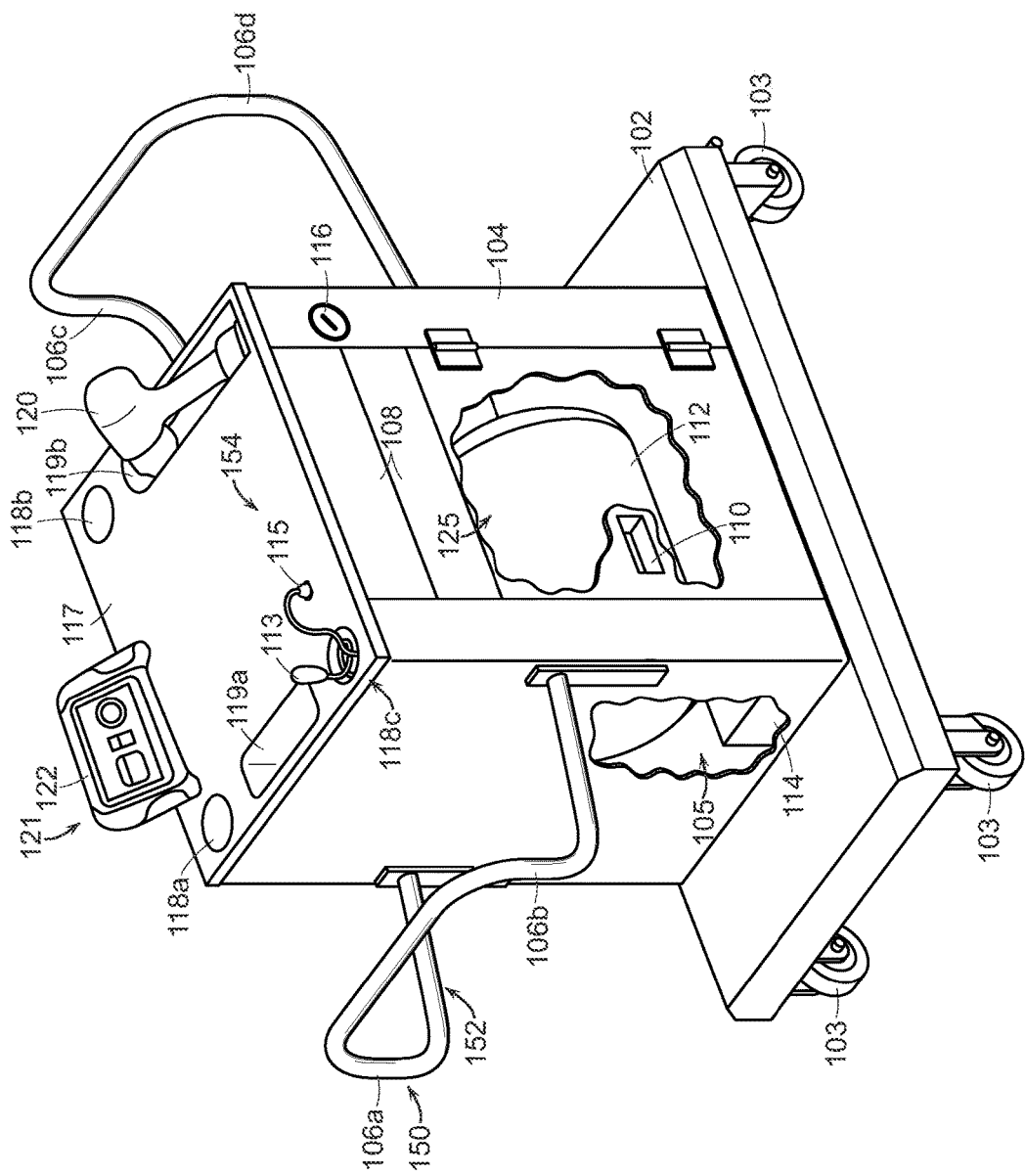
FIG. 1 is an isometric view of a vehicle service cart having, the features of a disclosed embodiment.

FIG. 1 shows a diagrammatic view of a vehicle service cart according to an embodiment disclosed herein. The service cart comprises a structure of a base 102 having a plurality of wheels 103 providing rolling motion to the cast. In one embodiment, wheels 103 are multi-directional casters, but one of ordinary skill will recognize alternative embodiments.

Extending from base 102 is an upper cabinet structure 104 defining an interior space 105 therein. In the shown embodiment, upper cabinet structure 104 further comprises solid walls to enclose the contents of the interior space 105 therein. In the shown embodiment, upper cabinet structure 104 additionally comprises a number of drawers 108 and a door 110. In some embodiments, drawers 108 and door 110 may each further comprise a locking mechanism. In some embodiments, the locking mechanism may collectively lock more than one of drawers 108 and door 110.

Coupled to the sides of upper cabinet structure 104 are a plurality of handles 106. In the embodiment shown, there are four handles 106a, 106b, 106c, 106d. Handles 106 comprise at least a substantially vertically-extending portion 150 and at least a substantially horizontally-extending portion 152. In some embodiments, handles 106 are suitable to hold a number of tires detached from a vehicle. In one embodiment, the tires are wheel-tire assemblies of consumer automobiles, but other contemplative alternatives include tires of motorcycles, multi-axle trucks used in freight shipping, all vehicles (ATVs), motorized bicycles, human-powered bicycles and other alternatives known to one of ordinary skill in the art. Handles 106 are designed to permit stable rolling of the service cart while loaded with tires. It is desirable for handles 106 to dispose the loaded tires such that the center of mass of the cart and its load falls within the outermost wheelbase of the wheels 103 of the service cart. It is further desirable for handles 106 to be designed such that the center of mass of the cart and its load falls within the outermost wheelbase of wheels 103 even when loaded asymmetrically. Thus, the cart, even when loaded, does not create a pivot point at any of the wheels 103 in the event that the cart is rolled over a crack, bump, ledge, or other irregularity in the rolling surface.

At least partially disposed within the interior space 105 of upper cabinet structure 104 is a compressed-air tank 112, having detachably affixed thereto an air hose 113. Air hose 113 is suitable for providing air to the tires of a vehicle. In a contemplated embodiment, compressed-air tank 112 has sufficient capacity to completely fill all the tires of at least one vehicle to the pressure designated as operable for the tire. In some embodiments, compressed-air tank 112 may be used on tires held by handles 106 or on tires still coupled to a vehicle.

In one contemplated embodiment, compressed-air tank 112 has sufficient capacity to fill four tires of a consumer automobile, but other contemplated alternatives have sufficient capacity to fill all tires of other vehicles including motorcycles, multi-axle trucks used in freight shipping, all-terrain vehicles (ATVs), motorized bicycles, human-powered bicycles and other alternatives known to one of ordinary skill in the art. In one embodiment, compressed-air tank 112 has sufficient pressure to operate a handheld pneumatic tool using air hose 113.

In one embodiment, at least partially disposed within the interior space of upper cabinet structure 104 is a rechargeable electric battery 114, having affixed thereto a power cable 115. Power cable 115 is suitable for providing an electrical charge to handheld electric power tools, batteries, and mobile electronic devices.

In one embodiment, the service cart further comprises an indicator 116. Indicator 116 provides the real-time status of the contents of compressed-air tank 112, such as an air pressure indication. In some embodiments, indicator 116 additionally provides the real-time status of the charge remaining in electric battery 114. In the shown embodiment, indicator 116 comprises an analog meter, but other contemplated embodiments include a digital meter, an adaptable digital display, or any other equivalent alternatives known to one of ordinary skill in the art. In one embodiment, indicator 116 is fluidly-connected to compressed-air tank 112 and electrically coupled to rechargeable electric battery 114.

On top of upper cabinet structure 104 is work surface 117, providing a substantially flat portion 154, a number of access portals 118 defined by the work surface, and a number of recessed compartments 119 defined by the work surface. In the embodiment shown, there are three access portals 118a, 118b, 118c and two recessed compartments 119a, 119b. Access portals 118 provide a passage from work surface 117 to the interior space 105 defined by upper cabinet structure 104. In the shown embodiment, access portals 118 are suitable to provide permit passage of air hose 113 and power cable 115 such that each is accessible on work surface 117. Recessed compartments 119 extend into the interior space 105 defined by upper cabinet structure 104, and are suitable for holding parts, tools, or other items used during operation of the service cart.

In one embodiment, recessed compartment 119 is configured to support a handheld power tool 120. In one embodiment, handheld power tool 120 is a battery-operated torque wrench, but other alternatives include an electric screwdriver, electric drill, or any other alternative recognized by one of ordinary skill in the art. In one embodiment, recessed compartment 119 is configured to provide a tool-specific contour matching handheld power tool 120. Other alternative embodiments are contemplated, including a locking mechanism, clasp, clamp or any other alternative known to one of ordinary skill in the art. In some embodiments, recessed compartment 119 is operably coupled to rechargeable electric battery 114 to charge handheld power tool 120 while it is supported by recessed compartment 119. Charging of handheld power tool 120 may be accomplished using inductive charging, specialized electric dock connectors, connector cables, or any other equivalent alternative known to one of ordinary skill in the art. In one embodiment, indicator 116 is operable to display the charge level of handheld power tool 120.

In the shown embodiment, work surface 117 further comprises a mounting structure 121 coupled thereto, operable to mount a tool, display, or device. In some embodiments, mounting structure 121 may be operable to detachably mount a portable electronic device 122. Portable electronic device 122 may be a portable electronic service tool, but other contemplated alternatives include a tablet computing device, general-purpose processor, an electronic diagnostic instrument, a display, or any other equivalent alternative known to one of ordinary skill in the art. In one embodiment, portable electronic device 122 is operably connected to rechargeable electric battery 114 to charge portable electronic device 122. Charging of portable electronic device 122 is implemented using inductive charging, specialized electric dock connectors, connector cables, or any other equivalent alternative known to one of ordinary skill in the art.

In one embodiment, portable electronic device 122 is configured to wirelessly monitor the status of compressed-air tank 112. The status of compressed-air tank 112 is monitored using, a pressure monitor 125, operably disposed within compressed-air tank 112, a valve in fluid communication with compressed-air tank 112, or a hose in fluid communication with compressed-air tank 112. Pressure monitor 125 comprises a pneumatic transducer operable to generate pressure data showing the internal pressure of compressed-air tank 112, and a wireless pressure-data transmitter operable to transmit the pressure data. In one embodiment, the wireless pressure-data transmitter is powered by an internal battery source. In another embodiment, the wireless pressure-data transmitter is powered using the rechargeable electric battery 114. In one embodiment, portable electronic device 122 is operable to receive the pressure data and display the status of the compressed-air tank 112. Portable electronic device 122 may be in wireless communication with a wireless network, and other devices (not shown) may be operable to receive the pressure data. In one embodiment, indicator 116 is in communication with pressure monitor 125 and is configured to display the pressure data.

In one embodiment, portable electronic device 122 is configured to wirelessly monitor the status of rechargeable electric battery 114. Rechargeable electric battery 114 may further comprise a battery-power monitor operable to generate battery-power data showing the remaining charge of rechargeable electric battery 114 and a wireless battery-data transmitter operable to transmit the battery-power data. In one embodiment, the wireless battery-data transmitter is powered by the rechargeable electric battery 114. In one embodiment, portable electronic device 122 is operable to receive the battery-data and display the status of the rechargeable electric battery 114. Portable electronic device 122 may be in wireless communication with a wireless network, and other devices (not shown) may be operable to receive the battery-power data. In one embodiment, indicator 116 is in communication with the battery-power monitor and is configured to display the battery-power data.

In one embodiment, portable electronic device 122 is configured to wirelessly monitor the status of handheld power tool 120. Handheld power tool 120 may further comprise a power-tool monitor operable to generate tool-battery data showing the remaining charge of the battery of handheld power tool 120 and a wireless tool-data transmitter operable to transmit the tool-battery data. In one embodiment, the wireless tool-data transmitter is powered by the battery source of handheld power tool 120. In one embodiment, portable electronic device 122 is operable to receive the tool-data and display the status of handheld power tool 120. Portable electronic device 122 may be in wireless communication with a wireless network, and other devices (not shown) may be operable to receive the tool-battery data. In one embodiment, indicator 116 is in communication with the power-tool monitor and is configured to display the tool-battery data.

Figure 2:
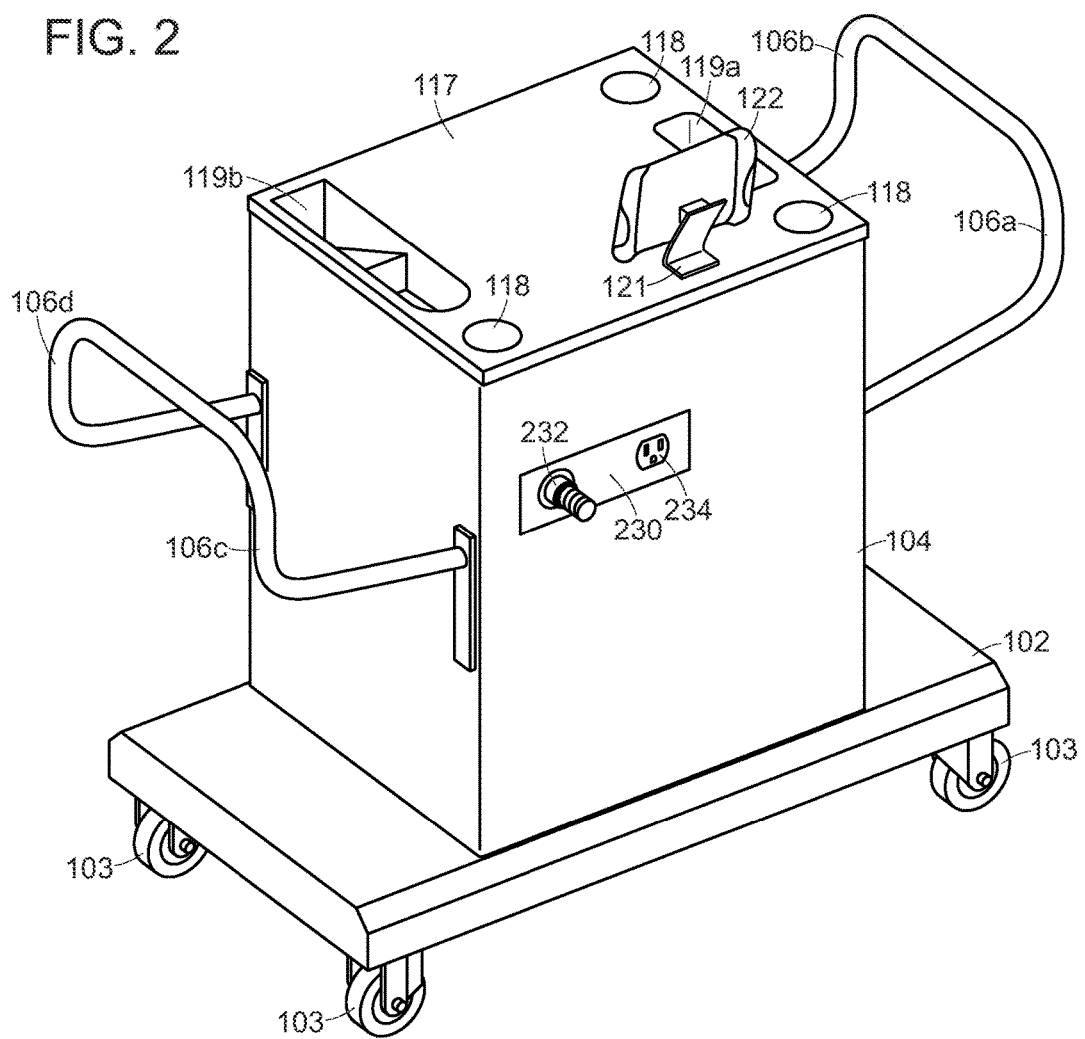
FIG. 2 is an alternative view of a vehicle service cart showing additional features of a disclosed embodiment.

FIG. 2 shows the structural elements of the embodiment of FIG. 1 from an alternative angle. FIG. 2 additionally shows a diagrammatic illustration including a charging port 230. In the embodiment shown, charging port 230 provides a pneumatic nipple valve 232 and electric power jack 234. The pneumatic nipple valve 232 is in fluid communication with compressed-air tank 112 (shown in FIG. 1), and the electric power jack 234 is electrically coupled to rechargeable electric battery 114 (shown in FIG. 1). Charging port 230 is operable to refill of the contents of compressed-air tank 112 to full capacity from an external air compressor (not shown). Charging port 230 is operable to recharge the rechargeable electric battery 114 to full capacity using an external electric power source (not shown). In one embodiment, charging port 230 is configured to permit hands-free docking to external sources of compressed air and electric power.

Figure 3:
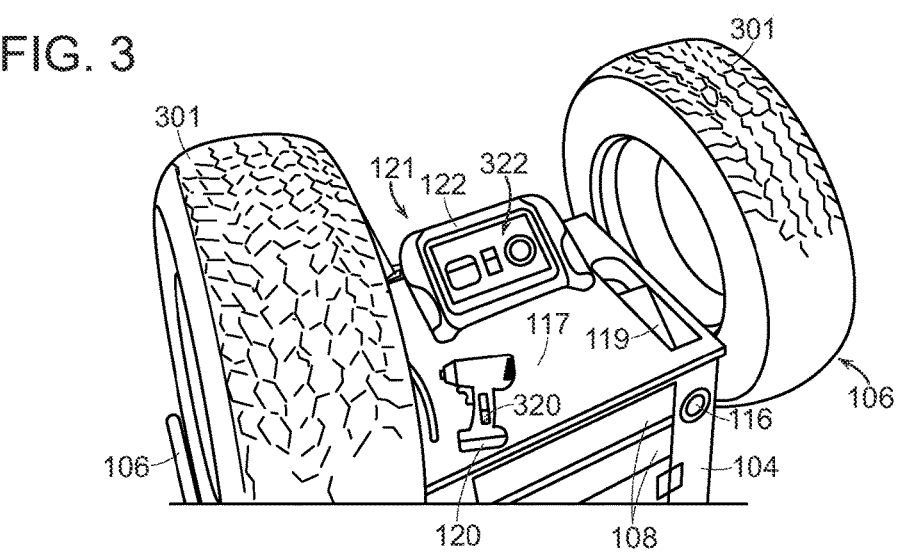
FIG. 3 is a close-up view of a work surface of a vehicle service cart having the features of a disclosed embodiment.

FIG. 3 shows a partial view of work surface 117 in an embodiment disclosed herein during service use. The cart is depicted loaded with vehicle tires 301. Air hoses 113 are shown in such proximity to vehicle tires 301 while loaded on handles 106. In this embodiment, portable electronic device 122 comprises a diagnostic device having a device display 322. In this embodiment, device display 322 is large enough to obscure mounting structure 121 when viewed from the angle shown. In this embodiment, handheld power tool 120 comprises a tool indicator 320. In this embodiment, portable electronic device 122 is in wireless communication with at least indicator 116 and handheld power tool 120, and reproduces the information provided by indicator 116 and tool indicator 320 using device display 322. As shown, device display 322 may provide additional information other than that provided in wireless communication with indicator 116 or handheld power tool 120. It is also envisioned that the device display 322 provides the information of tool indicator 320 and the indicator 116 in their absence, or any combination thereof.

Figure 4:
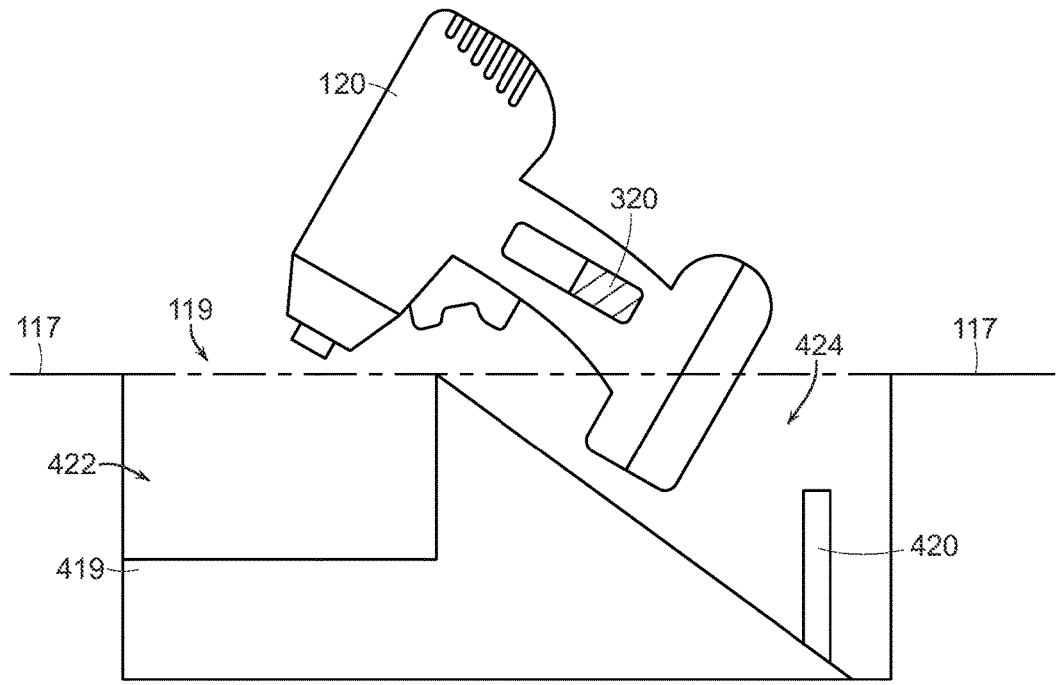
FIG. 4 is a diagrammatic side-view of a recessed compartment defined by a work surface of a vehicle service cart in a disclosed embodiment.

FIG. 4 shows a diagrammatic side-view of the interaction between handheld power tool 120 and recessed compartment 119 in one embodiment. Recessed compartment 119 comprises a contoured floor 419 having a recess contour reflecting the shape of handheld power tool 120. Contoured floor 419 conforms to the shape of handheld power tool 120 and provides support such that handheld power tool 120 can be readily accessible when placed within recessed compartment 119. Recessed compartment 119 is preferably deep enough such that handheld power tool 120 may be supported therein without sliding about or falling from atop work surface 117 (see FIG. 1) during normal use of the service cart. In the shown embodiment, contoured floor conforms to the shape of a handheld power tool 120 comprising a handheld torque wrench, but alternative embodiments may include an electric screwdriver, electric drill, or any other handheld power tool recognized by one of ordinary skill in the art. As shown in FIG. 1, work surface 117 may define a plurality of recessed compartments 119. In such embodiments, each of recessed compartments 119 may support different forms of handheld power tool 120 by having different configurations of contoured floor 419.

In some embodiments, recessed compartment 119 comprises a charging element 420, configured to provide an electric signal suitable to charge the battery of handheld power tool 120. The electric signal may be provided using rechargeable electric battery 114 (see FIG. 1), or charge dock 230 (see FIG. 2). Charging of handheld power tool 120 may be accomplished using inductive charging, specialized electric dock connectors, connector cables, or any other equivalent alternative known to one of ordinary skill in the art.

In this embodiment, the contoured floor 419 is designed to hold tool 120 in an ergonomic position making the tool 120 more accessible to a technician. In this figure, the contoured floor 419 depth and shape, as related to the work surface 117, defines a first area 422 configured to allow a portion of a head of the tool 120 to reside below the work surface 117. The first area 422 may be sized such that the center of mass of the head of the tool 120 is below the work surface 117. Also in this figure, the contoured floor 419 depth and shape, as related to the work surface 117, defines a second area 424 configured to holster the tool 120 such that a technician's hand may be allowed to grab the tool 120 to remove and replace it from the recessed compartment 119. The contoured floor 419 is shown here rising at an angle from the bottom of the recessed compartment 119 toward the work surface 117 to provide the tool 120 at an ergonomic position for the technician. Charging element 420 may be housed within the second area 424.

Figure 5:
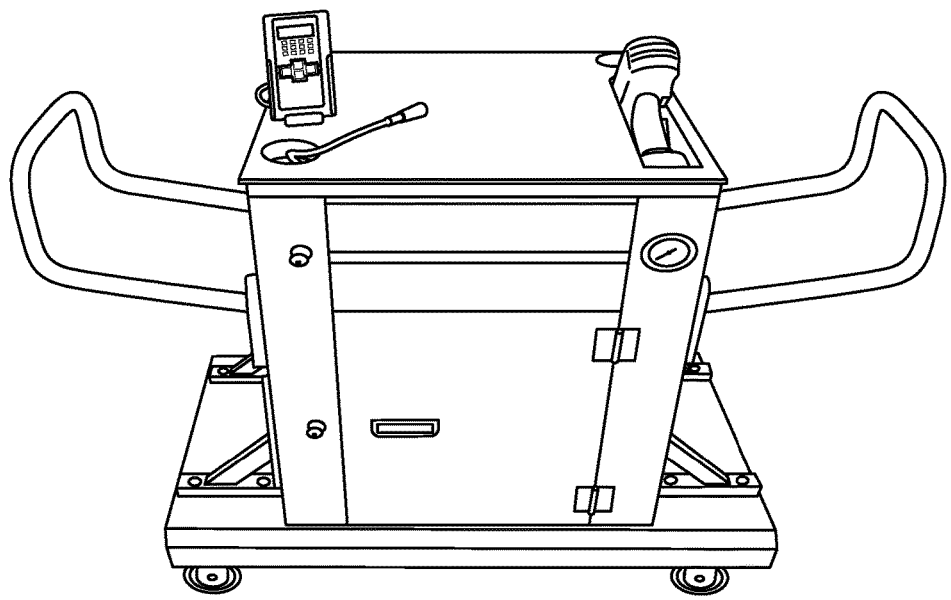
FIG. 5 is an isometric view showing the design elements of an embodiment of a vehicle service cart.

FIG. 5 provides an additional isometric view of an embodiment of the service cart, as a reference with respect to the particular design of the embodiment disclosed therein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A service cart comprising:
   a base with a plurality of wheels supporting the base for rolling movement, the base having a first end, a second end opposite the first end, and an upper surface disposed between the first end the second end;
   an upper cabinet structure with a first side and a second side, each side extending, from the upper surface of the base symmetrically inset from the first and second ends, respectively, the upper cabinet structure defining an interior space;

a plurality of handles extending from the sides of the upper cabinet structure, each handle having both a generally horizontally-extending portion extending away from the sides and a generally vertically-extending portion disposed away from the sides;

a drawer at least partially disposed within the upper cabinet structure;

a compressed-air tank at least partially disposed within the interior space of the upper cabinet structure, the compressed-air tank having an air hose affixed thereto suitable for utilizing the compressed-air tank; and a work surface atop the upper cabinet structure, the work surface defining a substantially flat portion, an access portal operable to permit passage of the air hose in and out of the interior space of the upper cabinet structure, and a recessed compartment extending into the interior space of the upper cabinet structure and configured to support a handheld power tool at least partially disposed within the recessed compartment.

2. The service cart of claim 1, further comprising an electric battery at least partially disposed within the interior space of the upper cabinet structure, the electric battery having a power cable affixed thereto operable for charging or discharging the electric battery.

3. The service cart of claim 2, further comprising a charging dock disposed outside of the interior space of the upper cabinet structure, the charging dock in fluid communication with the compressed-air tank or electrically coupled with the electric battery.

4. The service cart of claim 3, wherein the charging dock is in fluid communication with the compressed-air tank, and wherein the charging dock is further operably connectable to an external air compressor for automatically filling of the compressed-air tank by the external air compressor.

5. The service cart of claim 4, wherein the charging dock is electrically coupled to the electric battery, and wherein the charging dock is further operably connectable to an external electric power source for automatic charging of the electric battery by the external electric power source.

6. The service cart of claim 4, further comprising a portable electronic service tool mounting structure affixed to the work surface, the mounting structure configured to detachably mount a portable electronic service tool to the service cart.

7. The service cart of claim 6, wherein the compressed-air tank further comprises:
a pneumatic transducer operable to generate pressure data showing internal pressure of the compressed-air tank; and
a wireless transmitter operably connected to the pneumatic transducer to transmit the pressure data.

8. The service cart of claim 7, wherein the portable electronic service tool further comprises:
a wireless receiver operable to receive the pressure data transmitted by the wireless transmitter; and
an indicator operable to display the pressure data.

9. The service cart of 6, wherein the electric battery is at least partially disposed within the interior space of the upper cabinet structure is operably electrically coupled with the handheld power tool of the portable electronic service tool.

10. The service cart of claim 1, the plurality of handles further being operable to support a number of vehicle wheels uncoupled from vehicles such that the center of mass of the service cart while loaded with the number of vehicle wheels lies within an outermost wheelbase of the plurality of wheels of the service cart.

11. The service cart of claim 1, wherein the compressed-air tank is operable to fill one or more tires of a vehicle to an internal operating pressure designated for the one or more tires of a vehicle.

12. The service cart of claim 1, further comprising a portable electronic service tool mounting structure affixed to the work surface, the mounting structure configured to detachably mount a portable electronic service tool to the service cart.

13. The service cart of claim 12, the handheld power tool further comprising:
an electric power meter operable to generate power meter data regarding the remaining charge of the handheld battery-powered tool; and
a wireless transmitter operably connected to the electric power meter to transmit the power meter data.

14. The service cart of claim 13, wherein the portable electronic service tool further comprises:
a wireless receiver operable to receive the transmitted power meter data;
a display operable to display the received power meter data.

15. The service cart of claim 1, wherein the compressed-air tank further comprises:
a pneumatic transducer operable to generate pressure data regarding the internal pressure of the compressed-air tank; and
a wireless transmitter operably connected to the pneumatic transducer to transmit the pressure data.

16. The service cart of claim 15, wherein the wireless transmitter is one of a Bluetooth transmitter, a Zigbee transmitter, a Wi-Fi transmitter, or a radio-wave transmitter.

17. The service cart of claim 15, further comprising a portable electronic service tool mounting structure affixed to the work surface, the mounting structure configured to detachably mount a portable electronic service tool to the service cart.

18. The service cart of claim 17, wherein the portable electronic service tool further comprises:
a wireless receiver operable to receive the data transmitted by the wireless transmitter, and
a display operable to display the data transmitted by the wireless transmitter.

19. The service cart of claim 18, wherein the portable electronic service tool further comprises a wireless transceiver operable to transmit and receive data using a wireless network, wherein the wireless transceiver is operable to re-transmit the data transmitted by the wireless transmitter to other devices using the wireless network.

20. A cart comprising:
a rolling base having opposing ends;
a cabinet atop the base having sides symmetrically inset from the opposing ends;
a plurality of tire-mounts each extending from the cabinet sides and operable to support a detached vehicular wheel;
a compressed-air tank at least partially disposed within the cabinet; and
a work surface atop the cabinet defining a recess configured to support a power tool disposed partially therein and defining an access portal operable to provide access to an interior of the cabinet.

* * * * *